US012625796B2

(12) United States Patent
Leasck et al.

(10) Patent No.: US 12,625,796 B2
(45) Date of Patent: *May 12, 2026

(54) TESTING AUTOMATION FOR OPEN STANDARD CLOUD SERVICES APPLICATIONS

(71) Applicant: AT&T Intellectual Property I, L.P., Atlanta, GA (US)

(72) Inventors: Andrew Leasck, Saint Louis, MO (US); Douglas Paul Schveninger, Wildwood, MO (US); Oded Le'Sage, Austin, TX (US); Bryan Strassner, Union, MO (US); Kelly Carter, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 194 days.

This patent is subject to a terminal disclaimer.

(21) Appl. No.: 18/394,357

(22) Filed: Dec. 22, 2023

(65) Prior Publication Data

US 2024/0160560 A1      May 16, 2024

Related U.S. Application Data

(63) Continuation of application No. 17/348,439, filed on Jun. 15, 2021, now Pat. No. 11,853,197.

(51) Int. Cl.
| | |
|---|---|
| *G06F 11/3668* | (2025.01) |
| *G06F 9/451* | (2018.01) |
| *G06F 11/3698* | (2025.01) |
| *H04L 67/00* | (2022.01) |

(52) U.S. Cl.
CPC .......... *G06F 11/3688* (2013.01); *G06F 9/451* (2018.02); *G06F 11/3698* (2025.01); *H04L 67/34* (2013.01)

(58) Field of Classification Search
CPC ........................ G06F 11/3664; G06F 11/3668
See application file for complete search history.

(56) References Cited

U.S. PATENT DOCUMENTS

| | | |
|---|---|---|
| 10,565,093 B1 | 2/2020 | Herrin |
| 2019/0097900 A1 | 3/2019 | Rodriguez |
| 2020/0117434 A1 | 4/2020 | Biskup |
| 2021/0056007 A1 | 2/2021 | Viswanathan |
| 2021/0294600 A1 | 9/2021 | Kalia |
| 2022/0058582 A1 | 2/2022 | Greer |

*Primary Examiner* — Duy Khuong T Nguyen

(57) ABSTRACT

A method performed by a processing system including at least one processor includes monitoring a software repository for code changes, detecting a code change in a software instance that is stored in the software repository, generating a container image of the software instance in response to the detecting, creating a container for the container image, wherein the container encapsulates software needed to run a test suite on the software instance, configuring a testing platform for a development environment used to create the software instance, executing the test suite for the software instance by running the software encapsulated in the container on the testing platform, and publishing a test output of the test suite as a human-readable scorecard for the software instance.

20 Claims, 5 Drawing Sheets

200

200

500

TESTING AUTOMATION FOR OPEN STANDARD CLOUD SERVICES APPLICATIONS

This application is a continuation of U.S. patent application Ser. No. 17/348,439, filed Jun. 15, 2021, now U.S. Pat. No. 11,853,197, which is herein incorporated by reference in its entirety.

The present disclosure relates generally to software engineering, and relates more particularly to devices, non-transitory computer-readable media, and methods for automating testing of software applications built using open source cloud computing platforms.

BACKGROUND

Continuous integration/continuous delivery (CI/CD) is a pipeline that bridges the gap between development and operation in software engineering by automating the building, testing, and deployment of applications, allowing code changes to be delivered more frequently and more reliably. Continuous integration establishes an automated and consistent manner for building, packaging, and testing applications, while continuous delivery automates the delivery of applications to the intended infrastructure environments (e.g., production, development, testing, etc.). Thus, code changes occurring during continuous integration can be pushed to the intended environments in an automated manner.

SUMMARY

The present disclosure broadly discloses methods, computer-readable media, and systems for automating testing for open standard cloud services applications. In one example, a method performed by a processing system including at least one processor includes monitoring a software repository for code changes, detecting a code change in a software instance that is stored in the software repository, generating a container image of the software instance in response to the detecting, creating a container for the container image, wherein the container encapsulates software needed to run a test suite on the software instance, configuring a testing platform for a development environment used to create the software instance, executing the test suite for the software instance by running the software encapsulated in the container on the testing platform, and publishing a test output of the test suite as a human-readable scorecard for the software instance.

In another example, a non-transitory computer-readable medium may store instructions which, when executed by a processing system including at least one processor, cause the processing system to perform operations. The operations may include monitoring a software repository for code changes, detecting a code change in a software instance that is stored in the software repository, generating a container image of the software instance in response to the detecting, creating a container for the container image, wherein the container encapsulates software needed to run a test suite on the software instance, configuring a testing platform for a development environment used to create the software instance, executing the test suite for the software instance by running the software encapsulated in the container on the testing platform, and publishing a test output of the test suite as a human-readable scorecard for the software instance.

In another example, a device may include a processing system including at least one processor and a non-transitory computer-readable medium storing instructions which, when executed by the processing system, cause the processing system to perform operations. The operations may include monitoring a software repository for code changes, detecting a code change in a software instance that is stored in the software repository, generating a container image of the software instance in response to the detecting, creating a container for the container image, wherein the container encapsulates software needed to run a test suite on the software instance, configuring a testing platform for a development environment used to create the software instance, executing the test suite for the software instance by running the software encapsulated in the container on the testing platform, and publishing a test output of the test suite as a human-readable scorecard for the software instance.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
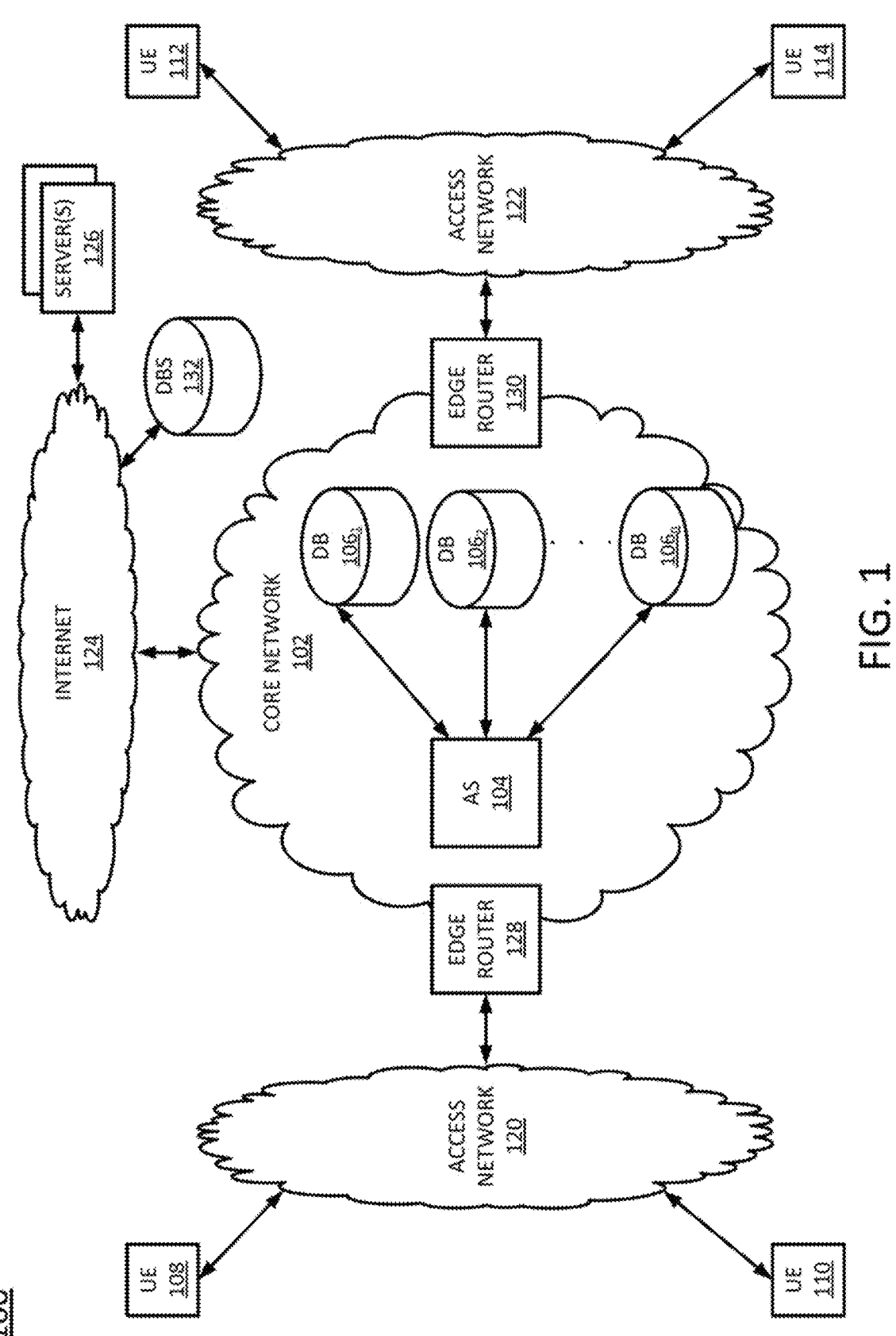
FIG. 1 illustrates an example system in which examples of the present disclosure for automating testing for open standard cloud services applications may operate.

The present disclosure broadly discloses methods, computer-readable media, and systems for automating testing for open standard cloud services applications. As discussed above, continuous integration/continuous delivery (CI/CD) is a pipeline that bridges the gap between development and operation in software engineering by automating the building, testing, and deployment of applications, allowing code changes to be delivered more frequently and more reliably. Since the purpose of CI/CD is to deliver reliable applications and code to users in a timely manner, CI/CD requires continuous testing. To this end, the CI/CD pipeline may comprise a plurality of configurable quality "gates" or checkpoints that are designed to verify that, for example, an application being developed meets certain standards before the development proceeds to the next stage. The process of testing application development against these gates may be referred to as "quality gating."

In some open standard computing platform APIs, quality gating requires the application code to be run on the deployment node in the cloud. This may result in a large amount of tests being run on the deployment node and/or a large number of people accessing the deployment node for the purposes of testing. For instance, the testing of even a single application may involve multiple different teams of programmers and technicians testing the application in multiple different technical ways (or "corridors") and at multiple different times in the lifecycle of a release candidate (i.e., an application build released internally to determine whether any critical problems have gone undetected in the code during the previous development phase).

As an example, an application that is built for use in a purpose-built cloud of a mobility service provider may need to be tested by teams including a development team, a lab readiness testing team, an integrated system testing team, a production validation testing team, an operational readiness testing team, and a mobility tenant. In this case, the development team might test in a first testing corridor, before the release candidate is delivered to the integrated system testing team in a second testing corridor. The integrated system testing team might test in the second testing corridor while the mobility tenant starts testing in a third testing corridor. The lab readiness testing team might test in the second testing corridor, third testing corridor, and a fourth testing corridor. The product validation testing team and the operational readiness testing team might test in the third testing corridor, the fourth testing corridor, and in production. If a release candidate fails testing in the second testing corridor or later, and if the cause of the failure is significant enough, this may cause the entire testing process to start over with a new release candidate in the first testing corridor.

Thus, it is typically undesirable to have a large number of tests running on the deployment node, or a large number of people accessing the deployment node for the purposes of testing, as this may be disruptive to operations. Moreover, test cases for quality gating are often limited to a minimum set of test cases, and typically do not include any custom test cases that may better match custom deployments of the open standard platform. The limited scope of the test cases may result in the failure to detect certain problems in the code of the custom deployments.

Examples of the present disclosure create a set of CI/CD jobs when the code of an application under development changes, where the set of CI/CD jobs in turn creates a set of containers that encapsulates the software needed to run the test suite on the changed code. Execution of the test suites is automated as a set of quality gates in the CI/CD pipeline. Results of the testing are then reported in a standardized, human-readable format, making it easy for software developers to quickly identify and correct code defects earlier in the CI/CD pipeline. These and other aspects of the present disclosure are discussed in greater detail below in connection with the examples of FIGS. 1-5.

To further aid in understanding the present disclosure, FIG. 1 illustrates an example system 100 in which examples of the present disclosure for automating testing for open standard cloud services applications may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a plurality of databases (DBs) $106_1$-$106_n$ (hereinafter individually referred to as a "database 106" or collectively referred to as "databases 106"), and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 500 depicted in FIG. 5, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable by a human user to control operations of the AS 104, which may be configured to automate testing for open standard cloud services applications, as discussed in greater detail below.

In one example, one or more servers 126 and one or more databases 132 may be accessible to user endpoint devices 108, 110, 112, and 114 via Internet 124 in general. The server(s) 126 and DBs 132 may be configured to operate in a manner similar to the AS 104 and DBs 106.

Figure 5:
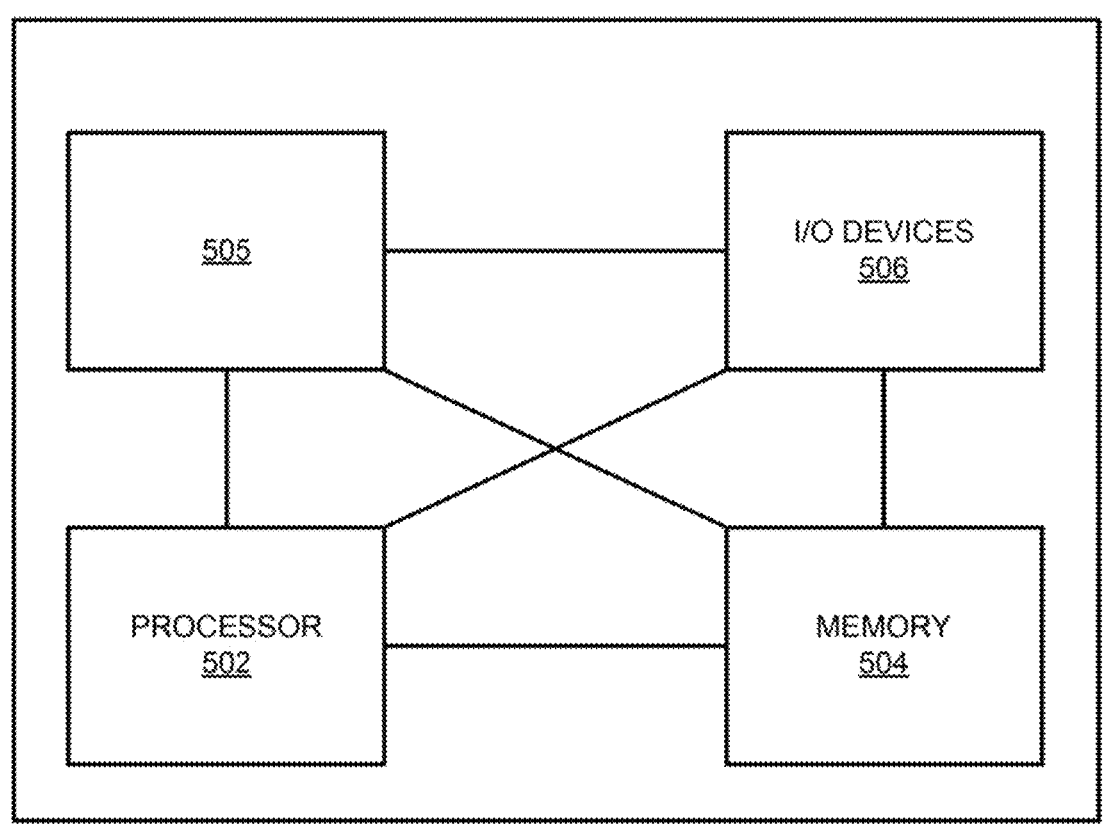
FIG. 5 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for automating testing for open standard cloud services applications, as described herein. The AS 104 may comprise one or more physical devices, e.g., one or more computing systems or servers, such as computing system 500 depicted in FIG. 5, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, the AS 104 may be configured to automate testing for open standard cloud services applications. In particular, the AS 104 may be configured to monitor software repositories (e.g., DBs 106) for code changes, and to automate testing of these code changes as quality gates in the CI/CD pipeline. For instance, the AS 104 may create a set of containers that encapsulates the software needed to run a test suite on the code changes. As an example, a container for functional and role-based access control (RBAC) API testing may contain and run upstream testing frameworks and test cases, as well as downstream custom test cases (e.g., custom API changes to upstream code for an application instance controller (AIC), deployment expected responses on an AIC instance, and other necessary software to read data from a site to fully configure the test environment to run the test suite container anywhere in a network that has access to a public network interface of an open standard cloud computing platform instance). As another example, a container for data plane testing may contain and run a framework and test cases to be executed when needed. A standard framework for the testing may allow all teams collaborating on application development to contribute to a shared set of test suites, which helps to shift testing to the left (i.e., to perform testing earlier in the lifecycle) in the release candidate process.

The AS 104 may be further configured to deliver reports or "scorecards" for tested code changes to one or more of the UE devices 108, 110, 112, and 114 for review. For instance, the AS 104 may generate scorecards that summarize the results of the testing in a human-readable format that makes it easy for a human software developer to identify code changes that may be problematic and/or require correction. In one example, the format of the scorecard is standardized, such that the test output looks the same regardless of which test suite is being executed or which layer of the application environment is being tested.

In one example, the DBs 106 may comprise software repositories for code changes. In one example, the software repositories may comprise storage locations for various software packages, such as software plugins. For instance, an enterprise may utilize the software repositories to provide access control, versioning, security checks for the software packages, and the like.

In one example, the DBs 106 may comprise physical storage devices integrated with the AS 104 (e.g., a database server or a file server), or attached or coupled to the AS 104, in accordance with the present disclosure. In one example, the AS 104 may load instructions into a memory, or one or more distributed memory units, and execute the instructions for automating testing for open standard cloud services applications, as described herein. One example method for automating testing for open standard cloud services applications is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
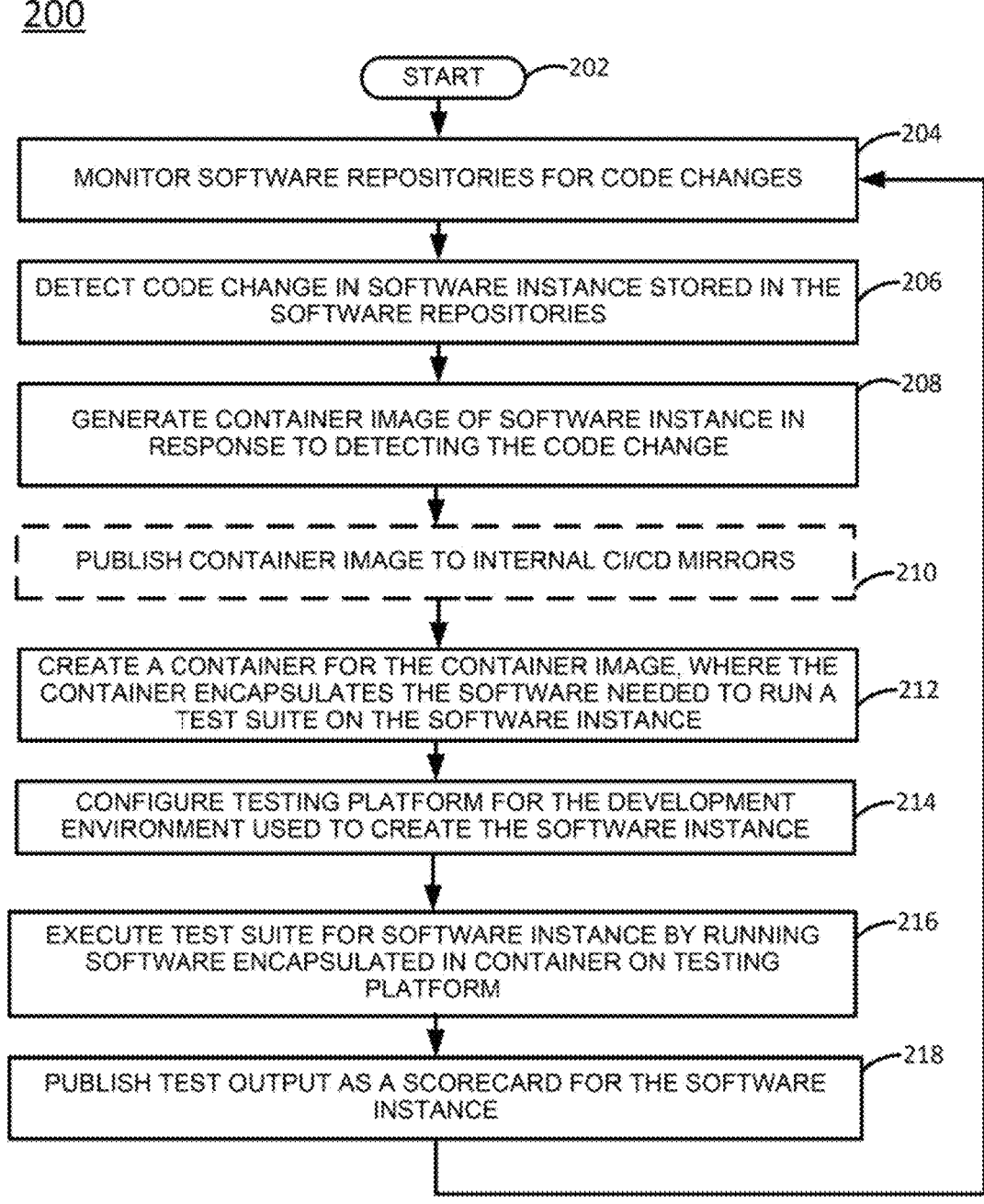
FIG. 2 illustrates a flowchart of an example method for testing an open standard cloud services application in an automated manner, in accordance with the present disclosure.

FIG. 2 illustrates a flowchart of an example method 200 for testing an open standard cloud services application in an automated manner, in accordance with the present disclosure. In one example, steps, functions and/or operations of the method 200 may be performed by a device as illustrated in FIG. 1, e.g., AS 104 or any one or more components thereof. In another example, the steps, functions, or operations of method 200 may be performed by a computing device or system 500, and/or a processing system 502 as described in connection with FIG. 5 below. For instance, the computing device 500 may represent at least a portion of the AS 104 in accordance with the present disclosure. For illustrative purposes, the method 200 is described in greater detail below in connection with an example performed by a processing system in a telecommunications service provider network, such as processing system 502.

The method 200 begins in step 202 and proceeds to step 204. In step 204, the processing system may monitor a plurality of software repositories for code changes. In one example, the software repositories may comprise storage locations for various software packages, such as software plugins. For instance, an enterprise may utilize the software repositories to provide access control, versioning, security checks for the software packages, and the like. In one example, the processing system may employ a syntax checker or a linter (i.e., a software program that suggests improvements to the software under review) to detect changes to the code in a stored plugin. For instance, the processing system may employ a linter to detect and flag programming errors, bugs, stylistic errors (e.g., syntax errors, uses of undeclared variables, spacing and formatting conventions, etc.), and the like.

In step 206, the processing system may detect a code change in a software instance stored in one of the software repositories.

In step 208, the processing system may generate a container image of the software instance in response to the detecting. In one example, the container image is a static file that includes executable code (e.g., the changed code detected in step 206), which allows the executable code to be run as an isolated process on an information technology (IT) infrastructure. For instance, the container image may include system libraries, system tools, and other platform settings that may be required in order for the executable code to be run in a container environment.

Figure 3:
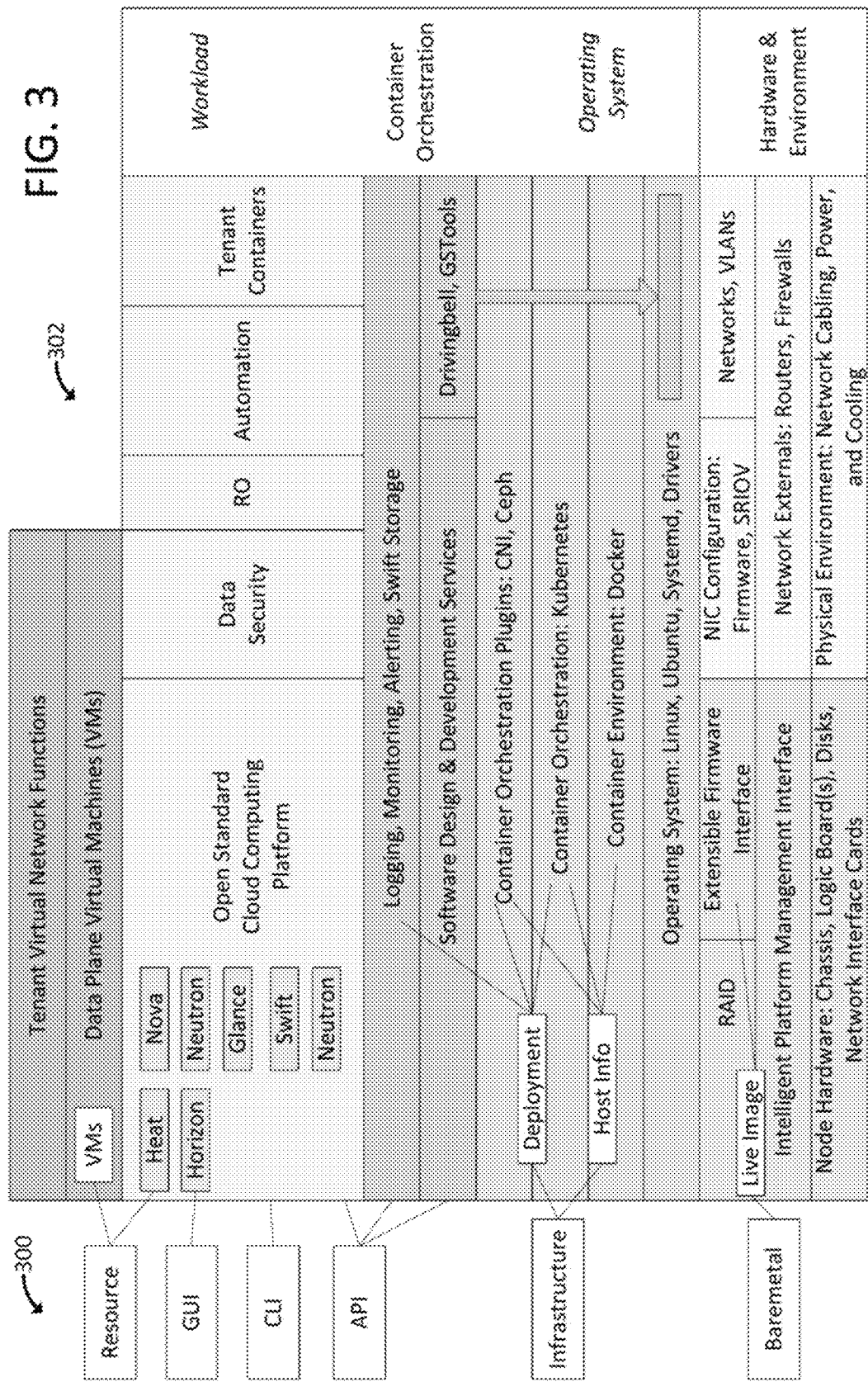
FIG. 3 illustrates a plurality of example container images that may be created in response to a detected code change.

FIG. 3, for instance, illustrates a plurality of example container images 300 that may be created in response to a detected code change. In one example, the plurality of container images 300 includes the following individual testing container images: a resource container image, a graphical user interface (GUI) container image, a command line interface (CLI) container image, an application programming interface (API) container image, an infrastructure container image, and a baremetal container image.

In addition, FIG. 3 illustrates a target environment 302 against which the plurality of container images 300 may be tested (i.e., the system under test). As illustrated, the target environment 302 may comprise a plurality of layers, where the plurality of layers may comprise a plurality of components, including containers, an operating system, and hardware components.

In the example illustrated in FIG. 3, the lowest layers of the target environment 302 may include hardware and physical environment requirements for an application, such as node hardware (e.g., chassis, logic boards, disks, network interface cards (NICs), and the like), an intelligent platform management interface (IPMI, i.e., a set of computer interface specifications for out-of-band management of computer systems and monitoring of the computer systems' operations), a redundant array of inexpensive disks (RAID) memory, an extensible firmware interface (EFI), a physical environment (e.g., network cabling, power, and cooling components, and the like), network externals (e.g., routers, firewalls, and the like), NIC configurations (e.g., firmware, single root input/output virtualization (SRIOV), and the like), networks, and virtual local area networks (VLANs).

The layers immediately above the hardware and physical environment component layers may comprise components of a host operating system and associated software (e.g., the LINUX or UBUNTU operating systems, SYSTEMD software suite, drivers for the operating system, and the like), as well as components of a container engine. The container engine may include a container environment (e.g., the DOCKER platform) and a container orchestration system (e.g., a system for automating application deployment, scaling, and management of containerized applications, such as the KUBERNETES system). The container orchestration system may include container orchestration plugins (e.g., container network interface (CNI), the CEPH storage platform, and the like).

The layers immediately above the operating system and container engine layers may comprise components of the software application for which the code change was detected. In one example, the software application layers may include software design and development services (e.g., AIRSHIP design and development services), geostatistical tools (e.g., the DRIVINGBELL or GSTOOLS toolboxes, and the like), and components for logging, monitoring, alerting, and storing testing data.

The layers immediately above the application layers may comprise an open standard cloud computing platform (e.g., the OPENSTACK platform, which may further comprise components such as the HEAT orchestration engine and the HORIZON dashboard, which provides an interface to OPENSTACK services including NOVA, NEUTRON, GLANCE, SWIFT, and the like), a framework to enable, monitor, and manage data security (e.g., the APACHE RANGER framework), automation servers and software (e.g., the JENKINS automation server, the ARTIFACTORY repository management system, quality automation systems such as that disclosed herein, and the like), tenant containers, data plane virtual machines (VMs), and tenant virtual network functions (VNFs).

The plurality of test suites represented by the plurality of container images 300 may be executed against the various areas of the application environment 302 which are targeted by the different test suites. Each test suite in the plurality of test suites is designed to exercise a respective layer (or in some cases layers) of the application environment 302 in order to verify that the respective layer is functional and operating as expected. The plurality of test suites ensures that the different layers of the application environment 302 are tested in a consistent and systematic manner.

For instance, a resource test suite may test the data plane of the open standard cloud computing platform, including VMs and the orchestration engine. A graphical user interface (GUI) test suite may test the GUI/dashboard of the open standard cloud computing platform. A command line interface (CLI) test suite may test various components of the open standard cloud computing platform. An application programming interface (API) test suite may test the control plane and role-based access control (RBAC) of the open standard cloud computing platform, as well as the software design and development services and the components for logging, monitoring, alerting, and storing testing data. An infrastructure test suite may test site-specific deployment and host information related to the operating system and container environment and orchestration (e.g., in one example, the infrastructure test suite may include components to test host nodes and private network APIs). A baremetal test suite may test a subset of the hardware and physical environment requirements.

In step optional 210 (illustrated in phantom), the processing system may publish the container image to internal CI/CD mirrors. In one example, repository mirroring within an enterprise allows for the mirroring of repositories to (and from) other storage locations. For instance, a plugin repository could be mirrored to another storage location via a push mirror. In one example, the other storage location may only be synchronized with the plugin repository when the push is committed (or when a forced update is initiated).

In step 212, the processing system may create a container for the container image, where the container encapsulates the software needed to run a test suite on the software instance. The container packages the code of the software instance (and all the software instance's dependencies) as an executable package with everything needed to run and test the software instance, such as runtime, system tools, system libraries, and settings.

Figure 4:
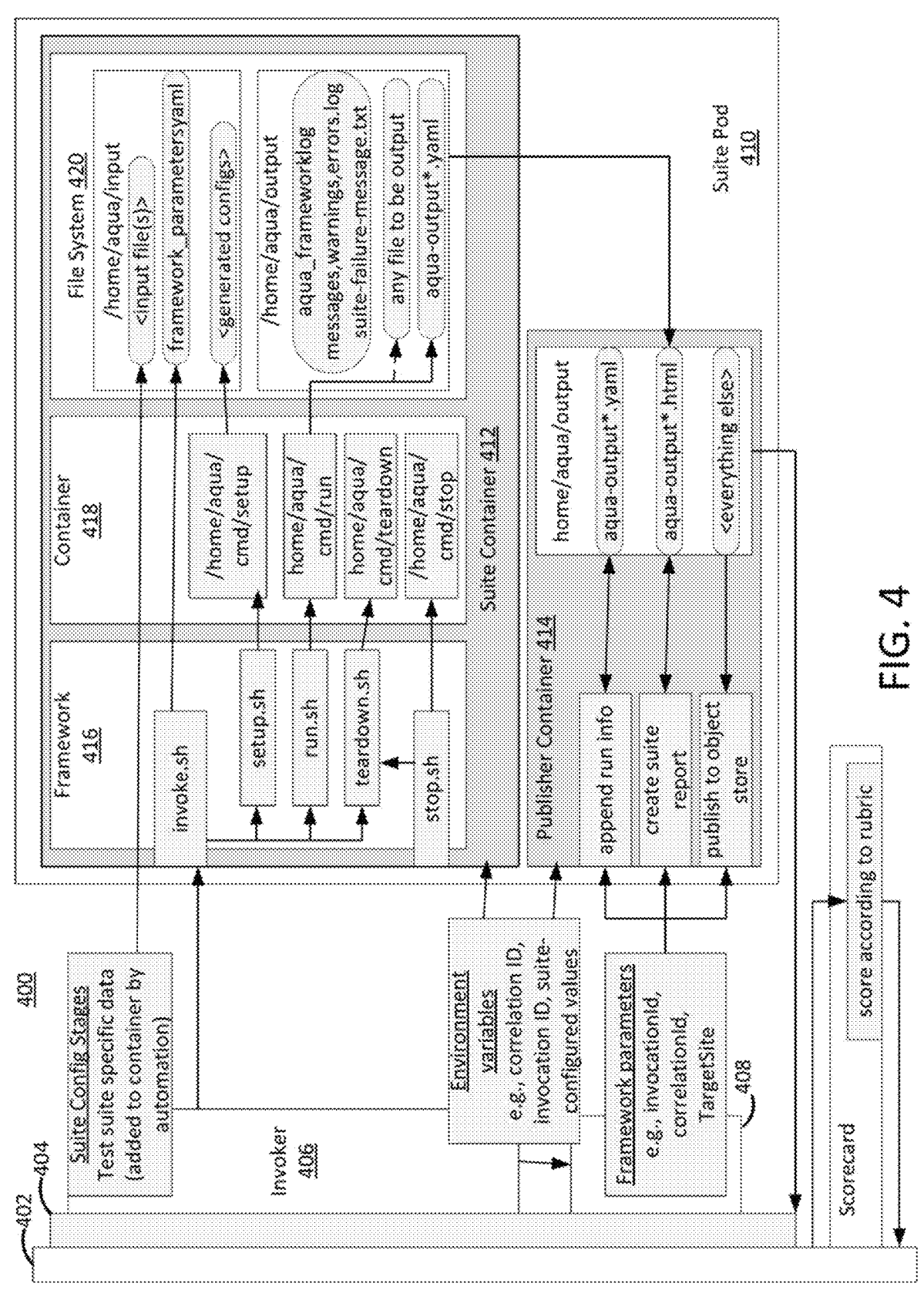
FIG. 4, for instance, illustrates an example standard container interface which may allow a test suite to be wrapped and executed.

FIG. 4, for instance, illustrates an example standard container interface (SCI) 400 which may allow a test suite to be wrapped and executed (e.g., using a declarative interface). The SCI for each test suite takes as input code changes, test cases, and other data and generates as output a scorecard that indicates whether there are any errors in the code changes. The operations that occur in between the input and output stages are specific to the layer of the application environment being tested, but the output (e.g., scorecards) are generated in a consistent format for every layer.

The left hand side of FIG. 4 illustrates components of an automation server, which may include, for example, invocations (e.g., one or more invoked test suites) 402), an invoked test suite 404, an invoker framework 406, and a publisher 408.

The right hand side of FIG. 4 illustrates a suite "pod" 410. In one example, the pod 410 may comprise the most basic deployable object in a system for automating application deployment, scaling, and management of containerized applications. In other words, the pod may comprise a self-contained host for the needs of a software application. As illustrated in FIG. 4, the pod 410 contains a plurality of containers; in one example, these containers include at least a suite container 412 and a publisher container 414. The suite container 412 and the publisher container 414 may be managed as a single entity and may share resources of the pod 410.

The suite container 412 may comprise the data necessary to execute the test suite being invoked (e.g., test suite 404). To this end, the suite container 412 may include a testing framework 416 (which may be provided by a team tasked with automating the testing process), a test container 418 (e.g., any of the containers of the plurality of containers 300 illustrated in FIG. 3, which may be provided by the team building the test), and a file system 420.

The invoker 406 may communicate with an invoke program in the testing framework 416 to invoke the test suite. The invoke program may, in turn, communicate with programs in the testing framework 416 for setup, run, and teardown of the test suite. Individually, these programs may call functions or commands in the test container 418. For instance, the setup program may call a function denoted as /home/aqua/cmd/setup; the run program may call a function denoted as home/aqua/cmd/run; and the teardown program may call a function denoted as home/aqua/cmd/teardown (where "aqua" denotes a program configured to automate the testing process, e.g., a portion of the automation layer illustrated in FIG. 3). A stop program in the testing framework 416 may call a function denoted as /home/aqua/cmd/ stop in the test container 418.

The invoke program in the testing framework 416, as well as some of the functions in the test container 418, may access files in the file system 420 (e.g., test inputs) during execution of the test suite as well as write files to the file system 420 (e.g., test outputs) during execution of the test suite. The file system 420 may store, as input files, test suite specific data (which may be added to the suite container 412 by automation). For instance, when setting up a test to run the api_functional test suite, a configuration file may be built to satisfy the input needs of the testing framework 416. The configuration file may comprise test switches to control which tests run and how the tests are configured (e.g., generated user data).

For instance, the invoke program in the testing framework 416 may retrieve framework parameters from the file system 420 (where the framework parameters may be written in a human-readable data-serialization language such as the YAML programming language). In one example, the framework parameters may include a correlation identifier (i.e., an identifier that is attached to requests and messages that reference a specific transaction or event chain), an invocation identifier (i.e., an identifier that identifies databases within Active Directory), and/or TargetSite (i.e., a property that can be used to retrieve information about a method that throws an exception).

The setup function in the test container 418 may retrieve generated configurations from the file system 420. For instance, continuing the example discussed above in connection with the api_functional test suite, the generated configuration files might be "injected" by the testing framework 416 into the file system 420 and subsequently consumed by the test container 418. The run function in the test container 418 may retrieve any files to be output (e.g., as test results/output) from the file system 420 (where the output may also be written in a human-readable data-serialization language).

The publisher container 414 receives the output from the file system 420 and contains data needed to generate a test suite report or "scorecard" from the output. In one example, the scorecard may score a tested code change according to a rubric, where the rubric may assign different grades or scores to tested code changes based on test output. For instance, one example rubric may assign scores as follows:

```
schema: aqua/rubric/v1
name: default
# each category can use 3 severity keys: fatal, error, info.
# The assessed severity matches the order fatal, error, info
# The order of these keys does not matter in the yaml.
categories:
  - name: clustermgr - cluster
    description: Tests of the clustermgr cluster
    fatal:
      -
^test_suite\.test_subset\.tests\.api\.clustermgr\.cluster\.test_public_ingress$
      - ^commands\.clustermgr\..*$
    error:
      -
^test_suite\.test_subset\.tests\.api\.clustermgr\.all_namespaces\..*$
      - ^test_suite\.test_subset\.tests\.api\.clustermgr\.cluster\..*$
      - ^test_bench.*\(Scored\)$
    info:
      - ^test_bench.*\(Not_Scored\)$
  - name: clustermgr - disk
    description: Tests for disk used by the clustermgr cluster
    error:
      - ^test_suite\.test_subset\.tests\api\.clustermgr\.disk\..*$
```

In the above example rubric, each category is listed by name, and each category optionally contains "fatal," "error," and "info" groupings. Each grouping, in turn, contains regular expressions to match tests by name that run as part of a test suite and to assign to each test the matching severity. In other examples, however, other types of rubrics may be used. As discussed in further detail below, a scorecard may be generated for each test suite execution.

Referring back to FIG. 2, in step 214, the processing system may configure a testing platform for the particular development environment that was used to create the software instance containing the code change. In one example, the development environment may comprise a low-code development or "LCD" platform, i.e., a development environment that allows a software application to be created using a GUI as opposed to being hand coded. For instance, an LCD platform may be desirable where accelerated delivery of the software application is needed, where a large number of people are contributing to the development of the software application, or where there are limited resources to fund initial setup, training, deployment, and maintenance of the software application.

In step 216, the processing system may execute the test suite by running the software encapsulated in the container on the testing platform. For instance, as discussed above in connection with FIG. 4, an instruction may be provided to an automation server to invoke the test suite, which in turn causes programs in the testing framework 416 of the suite container 412 to generate calls to functions in the test container 418. In one example, the invoker 406 of the SCI 400 can be called by the CI/CD pipeline at any time with a declarative run configuration that contains at least one test suite configuration.

In one example, the declarative run configuration is a YAML declaration that defines a list of suite configuration names, where the suite configuration names point to a YAML declaration that describes the necessary attributes to execute a set of test cases in a test suite. For instance, an example declarative run configuration that runs three test suites may be written as:

```
post_greenfield:
    fail_fast: false
    tests:
        - api_functional: full
            infrastructure: standard
        - resource: lite
```

In another example, a test suite configuration to test a functional API, and the attributes that will cause the SCI to run requested test cases with the SCI features, may be written as:

```
api_functional:
    full:
        filename: full
        concurrent_workers: 8
```

In step 218, the processing system may publish the test output (i.e., the results of the test suite) as a scorecard for the software instance. As discussed above, in one example, the processing system publishes the test results in the form of a "scorecard" or human readable report. In one example, the format of the scorecard is standardized, such that the test output looks the same regardless of which test suite is being executed or which layer of the application environment is being tested. Thus, the scorecards may allow a human software developer to quickly identify any code changes that fail testing.

In one example, the scorecard may indicate the test suite that was executed, a number of test cases that were run during execution of the test suite, a number of test cases that were skipped during execution of the test suite, the amount of time for which the test suite was run, the number of successful test cases run during the execution of the test suite, and the number of failing test cases run during the execution of the test suite. A human analyst may be able to view any particular test case that was run during the execution of the test suite to see whether the test case succeeded or failed. The scorecard may also indicate the testing framework parameters such as the correlation identifier, the invocation identifier, the TargetSite, the TargetSite type, the execution site, and the invocation source.

The method 200 may then return to step 204, and the processing system may continue to monitor the software repositories for code changes. Thus, the processing system may continuously monitor applications under development for code changes, so that the code changes may be tested with minimal delay and any errors may be detected and corrected at the earliest possible opportunity.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Thus, in some examples, the method 200 may create a set of CI/CD jobs when the code of an application under development changes, where the set of CI/CD jobs in turn creates a set of containers that encapsulates the software needed to run the test suite on the changed code. Execution of the test suites is automated as a set of quality gates in the CI/CD pipeline. Results of the testing are then reported in a standardized, human-readable format, making it easy for software developers to quickly identify and correct code defects early on in the CI/CD pipeline. The testing framework disclosed herein ensures that all data flowing through the automated testing platform between processes and containers remains in machine-readable form, but that the output of a testing suite is generated in a human-readable form such as YAML.

The method 200 may utilize sanctioned, open source test frameworks (e.g., such as the TEMPEST framework, the SHAKER framework, the TOX command line tool, the SONOBUOY diagnostic tool, and the like) while also extending and building upon these open source test frameworks to satisfy the testing needs for a given software application.

The method 200 may be particularly useful within the context of a telecommunications network or purpose-built cloud infrastructure designed to host 5G infrastructure. Such infrastructure is usually built on the premises of the telecommunications network service provider and tends to be relatively small (e.g., as compared to large-scale cloud storage and file backup infrastructures), and to perform at a high level with relatively low latency. In such infrastructures, it may be vital to provide a means for efficient and effective quality control. In one example, the methods and data structures disclosed herein may function to provide a quality assurance layer in such a purpose-built infrastructure (e.g., to ensure the cloud is operating as expected).

FIG. 5 depicts a high-level block diagram of a computing device or processing system specifically programmed to perform the functions described herein. As depicted in FIG. 5, the processing system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for testing an open standard cloud services application in an automated manner, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 505 for testing an open standard cloud services application in an automated manner (e.g., a software program comprising computer-executable instructions) can be loaded into memory 504 and executed by hardware processor element 502 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for testing an open standard cloud services application in an automated manner (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

monitoring, by a processing system including at least one processor, a software repository using a software program that checks for code changes;

detecting, by the processing system during the monitoring, a code change in a software instance that is stored in the software repository;

generating, by the processing system in response to the detecting, a container image of the software instance including the code change;

creating, by the processing system, a container for the container image, wherein the container encapsulates software needed to run a test suite on the software instance;

configuring, by the processing system, a testing platform for a development environment used to create the software instance;

executing, by the processing system, the test suite for the software instance by running the software encapsulated in the container on the testing platform, wherein the executing is automated as a quality gate during a stage of a development of the software instance in a continuous integration/continuous delivery pipeline, and wherein the quality gate is designed to verify that the software instance meets a predefined standard before the development is permitted to proceed to a next stage of the development that follows the stage; and publishing, by the processing system, a test output of the test suite as a human-readable scorecard for the software instance, wherein the human-readable scorecard identifies at least one of: the test suite, a number of test cases that were run during the executing of the test suite, a number of test cases that were skipped during the executing of the test suite, an amount of time for which the test suite was executed, a number of successful test cases run during the executing of the test suite, or a number of failing test cases run during the executing of the test suite.

2. The method of claim 1, wherein the software instance is part of an open standard cloud services application.

3. The method of claim 2, wherein the test suite is configured to exercise a specific layer of the container image, and wherein the container image comprises a plurality of layers, and each layer of the plurality of layers represents a different area of an application environment of the open standard cloud services application.

4. The method of claim 3, wherein the test suite is configured to verify that the specific layer is functional and operating as expected.

5. The method of claim 3, wherein the test suite is one of a plurality of test suites, and wherein the plurality of test suites are configured to test respective layers of the plurality of layers in a consistent manner.

6. The method of claim 5, wherein the container comprises a standard container interface that is configured to generate the scorecard in a format that is consistent across the plurality of test suites.

7. The method of claim 6, wherein the standard container interface comprises a suite container which contains data to execute the test suite and a publisher container to publish the test output.

8. The method of claim 7, wherein the suite container comprises a testing framework, a test container, and a file system.

9. The method of claim 8, wherein the testing framework comprises programs for setup, run, and teardown of the test suite.

10. The method of claim 9, wherein the programs call functions in the test container.

11. The method of claim 10, wherein the functions in the test container write data to the file system.

12. The method of claim 8, wherein the file system stores parameters of the testing framework.

13. The method of claim 12, wherein the parameters of the testing framework include at least one of: a correlation identifier, an invocation identifier, or a targetsite.

14. The method of claim 1, wherein the human-readable scorecard further identifies at least one of: a correlation identifier of a testing framework, an invocation identifier of the testing framework, a targetsite of the testing framework, a type of the targetsite, a site of the executing, or a source that invoked the test suite.

15. The method of claim 1, wherein the container packages the software instance as an executable package with runtime, system tools, system libraries, and settings to execute the test suite on the software instance.

16. A non-transitory computer-readable medium storing instructions which, when executed by a processing system including at least one processor, cause the processing system to perform operations, the operations comprising:

monitoring a software repository using a software program that checks for code changes;

detecting, during the monitoring, a code change in a software instance that is stored in the software repository;

generating, in response to the detecting, a container image of the software instance including the code change;

creating a container for the container image, wherein the container encapsulates software needed to run a test suite on the software instance;

configuring a testing platform for a development environment used to create the software instance;

executing the test suite for the software instance by running the software encapsulated in the container on the testing platform, wherein the executing is automated as a quality gate during a stage of a development of the software instance in a continuous integration/continuous delivery pipeline, and wherein the quality gate is designed to verify that the software instance meets a predefined standard before the development is permitted to proceed to a next stage of the development that follows the stage; and publishing a test output of the test suite as a human-readable scorecard for the software instance, wherein the human-readable scorecard identifies at least one of: the test suite, a number of test cases that were run during the executing of the test suite, a number of test cases that were skipped during the executing of the test suite, an amount of time for which the test suite was executed, a number of successful test cases run during the executing of the test suite, or a number of failing test cases run during the executing of the test suite.

17. The non-transitory computer-readable medium of claim 16, wherein the software instance is part of an open standard cloud services application.

18. The non-transitory computer-readable medium of claim 17, wherein the test suite is configured to exercise a specific layer of the container image, and wherein the container image comprises a plurality of layers, and each layer of the plurality of layers represents a different area of an application environment of the open standard cloud services application.

19. The non-transitory computer-readable medium of claim 18, wherein the test suite is configured to verify that the specific layer is functional and operating as expected.

20. A device comprising:

a processing system including at least one processor; and a non-transitory computer-readable medium storing instructions which, when executed by the processing system, cause the processing system to perform operations, the operations comprising:

monitoring a software repository using a software program that checks for code changes;

detecting, during the monitoring, a code change in a software instance that is stored in the software repository;

generating, in response to the detecting, a container image of the software instance including the code change;

creating a container for the container image, wherein the container encapsulates software needed to run a test suite on the software instance;

configuring a testing platform for a development environment used to create the software instance;

executing the test suite for the software instance by running the software encapsulated in the container on the testing platform, wherein the executing is automated as a quality gate during a stage of a development of the software instance in a continuous integration/continuous delivery pipeline, and wherein the quality gate is designed to verify that the software instance meets a predefined standard before the development is permitted to proceed to a next stage of the development that follows the stage; and publishing a test output of the test suite as a human-readable scorecard for the software instance, wherein the human-readable scorecard identifies at least one of: the test suite, a number of test cases that were run during the executing of the test suite, a number of test cases that were skipped during the executing of the test suite, an amount of time for which the test suite was executed, a number of successful test cases run during the executing of the test suite, or a number of failing test cases run during the executing of the test suite.

\*  \*  \*  \*  \*